United States Patent Office 3,166,486
Patented Jan. 19, 1965

3,166,486
RECOVERY OF LACTOSE AND PROTEIN
FROM WHEY
Maurice E. Hull, La Grange, Ill., assignor to Armour and Company, Chicago, Ill., a corporation of Delaware
No Drawing. Filed Aug. 7, 1961, Ser. No. 129,542
10 Claims. (Cl. 204—180)

This invention relates to the recovery of lactose and protein from whey, and more particularly to the treatment of whey for the reduction of ash content and the recovery thereafter of lactose and protein as separate products suitable for edible and pharmaceutical purposes.

Processes have heretofore been employed for the recovery of lactose resulting in a commercial recovery of about 70% lactose, but the processes have not resulted in recovery of protein as an edible or valuable product. In one process, the whey is subjected to electro-dialysis for the removal of 90% of the ash, but in such process the proteins are first removed and discarded because they precipitate and clog the dialyzing membranes.

I have discovered that lactose and protein can be recovered separately and in high yields and for edible and pharmaceutical purposes in a process in which a relatively low level of ash removal is carried out so that the proteins can remain in solution, and thereafter crystallizing the lactose and separating the lactose and proteins as separate products.

A primary object, therefore, of the invention is to provide a process in which a substantial amount of whey ash is removed, while at the same time maintaining the protein in solution during the ash removal, and thereafter separating the lactose and protein products. A further object is to provide a method whereby whey ash is separated and the remaining whey material subjected to crystallization and separation of the lactose and protein products to provide high yields of edible and pharmaceutical lactose and protein. A still further object is to provide a process in which a continuous demineralization of whey is carried out and in which lactose and protein products are recovered and washed, the wash water being recycled in the continuous recovery operation. A still further object is to provide a process in which whey is subjected to electro-dialysis for the removal of only enough ash to make the end product palatable, thereby avoiding protein precipitation, and thereafter recovering from the remaining whey material, separate high-quality lactose and protein products. Other specific objects and advantages will appear as the specification proceeds.

In one embodiment of the invention, whey, such as, for example, cheese whey, is subjected to treatment for the removal of the greater part of the whey ash, but not in excess of the amount which would result in insolubilizing proteins. For example, by removing 60–65% of the whey ash, it is found that the whey globulins and lactalbumins remain in solution during the ash removal, and thereafter the remaining whey material may be evaporated to increase the whey solids to about 60%, and the lactose then crystallized and separated from the protein.

The whey ash may be removed by any suitable method. The electro-dialysis process for removing salts using ion exchange membranes is found to be highly effective in reducing the salts in whey. Electrolytic de-salting or any other suitable method may be employed.

After the removal of the salt or minerals which tend to interfere with the crystallization of the lactose, the removal being limited to the extent that the protein constituents remain in solution, the remaining whey material may be evaporated until the whey solids are in the neighborhood of 60–65%, or at such concentration that crystallization of the lactose readily occurs. After the lactose has crystallized, this product may be separated from the protein by centrifuging or by any other suitable means.

In the crystallizing step, I prefer to employ a pH of about 6–7, and preferably within the range of pH 6.0 to 6.8.

In a continuous operation, I prefer to return the wash water used in the washing of the lactose, etc. to the preceding crystallizing step so as to increase the final yield of the product.

In a typical operation in which cheese whey is subjected to electro-dialysis, using ion exchange membranes to reduce the salt content approximately 60% and thereafter the treated whey is concentrated in an evaporator to 60% solids and the lactose allowed to crystallize, followed by removal of the lactose by centrifugation and washing, it is found that recoveries as high as 87.5% are obtained, whereas theoretical yields calculated for such conditions are 88.5%.

In the electro-dialysis method, the ion exchange membrane units are made up of many electrolytic cells consisting of pairs of anions and cations exchange membranes. By the use of an electric current, the cations and anions are forced through these selective membranes which thereby reduce the salt content of the solution. Apparatus used in such procedure is described in U.S. Patent No. 2,758,965.

Specific examples may be set out as follows:

Example I

Approximately 30 gallons of cheese whey were treated in three lactose runs of 10 gallons each, using the wash water from each preceding run to add to each batch and thereby increasing the lactose yield. Prior to the runs, the 30-gallon batch had been subjected to electro-dialysis using exchange membranes to remove 63% of the ash, the temperature being maintained at about 24–38° C. In each of the tests 1, 2 and 3, the treated whey was evaporated to a final total solids concentration of about 60%. Such concentrations, the pH, and other conditions of the lactose runs, together with the results, are set out in the following table:

|  | 1 | 2 | 3 |
|---|---|---|---|
| Whey, gms | 27,000 | 27,000 | 28,500 |
| Wash water, gms | 1,026 | 1,522 | 1,289 |
| pH, after adding NaOH | 6.55 | 6.55 | 6.8 |
| Curd test, percent | 50 | 45 | 55 |
| Final T.S. percent | 61.2 | 60.4 | 60.0 |
| Condensed whey, gms | 2,907 | 3,075 | 3,370 |
| Lactose, gms | 1,300 | 1,239 | 1,364 |
| Lactose, moisture percent | 12.8 | 8.7 | 10.3 |
| Lactose, protein percent | 1.0 | 0.85 | 0.74 |
| Lactose, ash percent | 0.35 | 0.35 | 0.40 |
| Lactose, recovery percent, H₂O free | 85.8 | 85.6 | 87.5 |
| Lactose, yield/100 whey, H₂O free | 4.2 | 4.2 | 4.3 |
| Mother liquor, gms | 1,337 | 1,315 | 1,632 |
| Mother liquor, T.S. percent | 39.3 | 42.2 | 41.9 |
| Mother liquor, protein percent | 15.7 | 17.3 | 16.6 |
| Mother liquor, ash percent | 3.5 | 3.8 | 3.9 |
| Mother liquor, lactose percent | 20.1 | 21.1 | 21.4 |
| Mother liquor, viscosity, MacMichael, degrees |  | 7 |  |
| Mother liquor, pH |  | 6.15 |  |

The above product yields are higher than any commercial or laboratory yields with which I am familiar. The yields are calculated after adjusting for dilution and assuming that the whey averages 4.9% lactose.

Example II

Untreated whey was subjected to electro-dialysis as described in Example I to remove approximately 65% of the ash. The treated whey was then concentrated to a higher total solids than desired and diluted back to 63% total solids prior to crystallization. A tendency was noted for the lactose to crystallize in the evaporator at a temperature of 130° F. After crystallization and separation by centrifuging, the lactose recovery was 81.8%, and the protein recovery 16.0%.

While in the foregoing specification I have set forth procedure in considerable detail for the purpose of illustrating an embodiment of the invention, it will be understood that such procedure may be varied widely by those skilled in the art without departing from the spirit of my invention.

I claim:

1. In a process for the recovery of lactose and protein from whey, the steps of removing about 60-65% of the whey ash while keeping the whey proteins in solution, evaporating the remaining whey material to increase the whey solids to about 60%, crystallizing the lactose, and thereafter separating the lactose from the protein solution.

2. The process of claim 1 in which about 60% of the ash is removed.

3. The process of claim 1 in which the remaining whey material is concentrated to increase the whey solids to about 63%.

4. In a process for the recovery of lactose and protein from whey, the steps of electro-dialyzing the whey to remove about 60-65% of the whey ash while keeping the whey proteins in solution, evaporating the remaining material to increase the whey solids to about 60%, crystallizing the lactose, and centrifuging to separate the lactose from the protein containing solution.

5. The process of claim 4 in which the lactose is washed and the wash water recycled for recrystallization.

6. In a process for the recovery of lactose and protein from whey, the steps of electro-dialyzing whey to remove about 60-65% of the whey ash, concentrating the whey solids to about 60%, crystallizing the lactose, and separating the lactose and protein.

7. The process of claim 6 in which the pH during crystallization is maintained at about 6-7.

8. The process of claim 7 in which the pH is about 6.0-6.8.

9. In a continuous process for the recovery of lactose and protein from whey, the steps of electro-dialyzing the whey to remove about 60% of the ash, concentrating the remaining material to a solids content of about 60%, crystallizing the lactose in a crystallizing zone, separating the lactose and washing it, and returning the wash water to the crystallizing zone.

10. In a whey treating process, the steps of electro-dialyzing whey to remove about 60-65% of the whey ash, evaporating the remaining material to increase the whey solids to about 63%, crystallizing the lactose while maintaining a pH of about 6.0-6.8, and separating the lactose and protein.

References Cited in the file of this patent

UNITED STATES PATENTS

| | | |
|---|---|---|
| 2,439,612 | Peebles | Apr. 13, 1948 |
| 2,465,906 | Meade et al. | Mar. 29, 1949 |
| 2,555,211 | Wallace | May 29, 1951 |
| 2,566,477 | Abrahamczik | Sept. 4, 1951 |
| 2,604,403 | Wiechers | July 22, 1952 |
| 2,631,100 | Aten et al. | Mar. 10, 1953 |
| 2,758,965 | Block | Aug. 14, 1956 |
| 2,778,750 | Hull | Jan. 22, 1957 |

FOREIGN PATENTS

| | | |
|---|---|---|
| 248,993 | Great Britain | Mar. 18, 1926 |
| 652,485 | Great Britain | Apr. 25, 1951 |